United States Patent
Scintilla et al.

(10) Patent No.: US 12,390,848 B2
(45) Date of Patent: Aug. 19, 2025

(54) MOLD FOR HOT FORMING OF SHEET MATERIALS

(71) Applicant: FONTANA PIETRO S.P.A., Calolziocorte (IT)

(72) Inventors: Leonardo Daniele Scintilla, Calolziocorte (IT); Paolino Zica, Calolziocorte (IT); Annalisa Mirabile, Calolziocorte (IT); Marco Fontana, Calolziocorte (IT); Donato Sorgente, Calolziocorte (IT); Andrea Lombardi, Calolziocorte (IT)

(73) Assignee: FONTANA PIETRO S.P.A., Calolziocorte (IT)

( * ) Notice: Subject to any disclaimer, the term of this patent is extended or adjusted under 35 U.S.C. 154(b) by 207 days.

(21) Appl. No.: 18/255,711

(22) PCT Filed: Dec. 2, 2021

(86) PCT No.: PCT/IB2021/061217
§ 371 (c)(1),
(2) Date: Jun. 2, 2023

(87) PCT Pub. No.: WO2022/118230
PCT Pub. Date: Jun. 9, 2022

(65) Prior Publication Data
US 2023/0415217 A1     Dec. 28, 2023

(30) Foreign Application Priority Data

Dec. 4, 2020 (IT) .......................... 102020000029915

(51) Int. Cl.
*B21D 37/10* (2006.01)
*B21D 26/031* (2011.01)
(Continued)

(52) U.S. Cl.
CPC .................................. *B21D 37/10* (2013.01)

(58) Field of Classification Search
CPC .... B21D 37/10; B21D 26/031; B21D 26/055; B21D 37/16
See application file for complete search history.

(56) References Cited

U.S. PATENT DOCUMENTS

| 2,689,372 A | 9/1954 | Goulding, Jr. et al. |
| 4,888,973 A | 12/1989 | Comley et al. |

(Continued)

FOREIGN PATENT DOCUMENTS

| CN | 1631576 A | * | 6/2005 |
| CN | 101468373 A | | 7/2009 |

(Continued)

OTHER PUBLICATIONS

English translate (CN109647983A), retrieved date Feb. 9, 2025.*
(Continued)

*Primary Examiner* — Mohammed S. Alawadi
(74) *Attorney, Agent, or Firm* — Lucas & Mercanti, LLP

(57) ABSTRACT

A mold for hot forming of materials in the form of a sheet is disclosed having a first half-shell bearing a die and a second half-shell, between which a chamber for forming the plate is provided. The second half-shell is provided with channels and respective holes for feeding a pressurized gas into the chamber. Inside the die there is at least one ventilated chamber, equipped with heating assemblies and ventilation assemblies for the circulation of hot air inside a ventilated chamber.

8 Claims, 4 Drawing Sheets

(51) Int. Cl.
    *B21D 26/055*    (2011.01)
    *B21D 37/16*    (2006.01)
    *B29C 35/02*    (2006.01)

(56) References Cited

U.S. PATENT DOCUMENTS

| | | |
|---|---|---|
| 4,984,348 A | 1/1991 | Cadwell et al. |
| 5,277,045 A | 1/1994 | Mahoney et al. |
| 5,410,132 A | 4/1995 | Gregg et al. |
| 5,467,626 A | 11/1995 | Sanders et al. |
| 6,810,709 B2 | 11/2004 | Hammar et al. |
| 6,835,254 B2 | 12/2004 | Hammar et al. |
| 7,159,437 B2 | 1/2007 | Schroth et al. |
| RE43,012 E | 12/2011 | Rashid et al. |
| 9,056,413 B1 | 6/2015 | Cox et al. |
| 2003/0000275 A1 | 1/2003 | Spence et al. |
| 2011/0014315 A1 | 1/2011 | Okoli et al. |
| 2011/0239721 A1* | 10/2011 | Carter ................. B21D 26/021 72/342.2 |
| 2017/0087617 A1 | 3/2017 | Prasannavenkatesan et al. |

FOREIGN PATENT DOCUMENTS

| | | | |
|---|---|---|---|
| CN | 109647983 A * | 4/2019 | ............ B21D 37/01 |
| DE | 3739213 A1 | 6/1989 | |
| TW | I611911 B * | 1/2018 | |
| WO | 2019084128 A1 | 5/2019 | |

OTHER PUBLICATIONS

English translate (CN1631576A), retrieved date Feb. 9, 2025.*
English translate (TWI611911B), retrieved date Feb. 9, 2025.*
International Search Report and Written Opinion for Corresponding International Application No. PCT/IB2021/061217, Mar. 11, 2022, 12 Pages.
International Preliminary Report On Patentability for Corresponding International Application No. PCT/IB2021/061217, Feb. 17, 2023, 15 pages.

* cited by examiner

MOLD FOR HOT FORMING OF SHEET MATERIALS

CROSS-REFERENCE TO RELATED APPLICATIONS

This application is a 371 of PCT/IB2021/061217, filed Dec. 2, 2021, which claims the benefit of Italian Patent Application No. 102020000029915, filed Dec. 4, 2020.

FIELD OF THE INVENTION

The present invention relates to a mold for hot forming sheet materials.

BACKGROUND OF THE INVENTION

The mold object of the present invention is particularly designed for applications in which the forming of a sheet of plastically deformable material is carried out by hot pressing and in the presence of a pressurized gas, as for example occurs in the superplastic deformation processes of sheet metal material, or in hot forming processes, such as Quick Plastic Forming, High Speed Blow Forming, Hot metal gas forming, or Drape Forming.

Superplasticity is the term used to indicate a particular deformation behavior shown by metallic materials such as aluminum, magnesium and their alloys, under certain process conditions, and can be defined as the ability of some polycrystalline materials to exhibit high elongation before breaking, in an isotropic or near isotropic way. The elongations reached vary between 200 and 1000%, although elongations of up to 5000% have been recorded in some tensile tests.

In the process of hot forming sheets of metallic materials with the mold according to the invention, a sheet of metallic material is positioned and heated between a mold and a die, usually at temperatures above 400° C., and subsequently deformed by the action of a pressurized gas. In this way, the sheet is forced to copy the geometry of the die or the counter-mold against which it is pressed, thus obtaining the final component.

However, the invention also applies to the hot forming of sheets made of different materials, such as sheets of plastic material, composite materials and the like.

In the hot forming processes described above, the forming temperature is a critical parameter. In fact, only a small variation thereof on the surface of the mold is allowed, due to the fact that the sheet must be formed inside the optimal range of the process parameters specific to each material.

Variants are known of the hot forming technique, which in any case use a heated mold and the deformation of a sheet of material by means of a gas.

USRE43012E (Rashid et al.) describes the "Quick Plastic Forming" technique, a variant of the superplastic forming technique, with which it is possible, in a temperature range of 400-510° C., to deform aluminum-magnesium alloy sheets at gas pressures between 250 psi and 500 psi, or greater, in order to obtain deformation rates of more than $10^{-3}$ $s^{-1}$, outside the superplasticity range, obtaining forming times of about 12 minutes, which is competitive for the automotive market. USRE43012E describes a method of reducing the forming cycles applied in the case in question to the forming of an automotive part (the decklid, or rear hood) but the forming mold is typical of an SPF forming technique. The type of heating implemented is not defined.

U.S. Pat. No. 10,166,590B2 (Prasannavenkatesan et al.) describes a technique called "High Speed Blow Forming Processes" for the production of parts by combining a "hot crash forming" phase and a subsequent "fast" forming with pressurized gas. The crash forming mold is positioned as the upper part of the gas forming mold. The gas forming phase is a "high speed blow forming" because speeds of $10^{-1}$ $s^{-1}$ are reached thanks to the pressurized gas, since almost the whole form is produced in the first "crash" forming phase. U.S. Pat. No. 10,166,590B2 describes the combination of the two techniques and how to perform it. The molds are heated like the SPF molds, the type of heating implemented is not defined.

U.S. Pat. No. 4,984,348A (Cadwell) describes a technique called "Superplastic Drape Forming", which uses auxiliary sheets (or driver sheets) of superplastic material to push, against a suitable shaping tool, a smaller sheet not fixed on the edge, in order to form it incrementally. The edges are free to be formed, thus also avoiding unwanted deformations or breakages. The process allows complex three-dimensional shapes to be obtained. The technique is a variant of superplastic forming and uses ceramic molds, typical of titanium forming, and the heating takes place by means of radiant type heaters inside ceramic platens fixed on the press. The type of heating implemented, typical of the SPF technique, is not claimed.

Currently, the state of the art provides for different types of heating of the molds.

One technique makes use of oven presses in which the molds are assembled and heated together with the environment circumscribed by the work area.

Another technique makes use of metal or ceramic plates or blocks, heated by cartridge electric resistances inserted in holes especially drilled in the plate, on which the mold rests and is heated by conduction.

Yet another method does not involve the use of heating plates, since the holes for inserting the cartridges are made directly in the mold.

The advantage of the first two methods is that of being able to make molds of smaller dimensions and avoid the complex and costly drilling process for each mold.

The latter method has the advantage of being able to configure the best arrangement of the cartridges to obtain maximum uniformity of the temperature on the mold, thus heating only where necessary.

U.S. Pat. No. 5,277,045 (Mahoney et al.) describes a method and an apparatus for superplastic forming of metal components at temperatures above 1000° C. and up to 1250° C. The process is carried out by heating two ceramic molds by means of cartridges housed therein, positioned inside two metal containers that resist the high closing load of the sheet.

U.S. Pat. No. 6,810,709B2 (Hammar et al.) describes a pair of superplastic forming molds heated and enclosed by insulating material, mounted on two unheated plates and connected to the press. The temperature of the various portions of the mold can be independently controlled through the control of heaters arranged in areas within it.

U.S. Pat. No. 7,159,437B2 (Schroth et al.) discloses a mold heated with cartridge electrical resistors. The electrical resistors are powered by a single source and controlled using a single temperature measurement taken in only one area, but thanks to the implementation of numerical thermal analyses, and the location of the heaters inside the mold is optimized in such a way as to maintain the surface in contact with the sheet inside a predetermined temperature range.

The latter principle is one of those used in the automotive field thanks to the shorter mold heating times and the possibility of heating locally, where necessary.

The disadvantages associated with this heating method lie in the need to arrange the cartridges accurately to avoid the risk of non-homogeneous heating of the mold, in the need to carry out expensive processing of the mold in order to allocate the resistors, and in the difficulty of maintenance during operation.

There are, however, other solutions that try to avoid the high costs of heating the molds, by applying heat directly to the sheet to be formed, using one or more rapidly moving lasers, infrared lamps or induction heaters.

U.S. Pat. No. 6,835,254B2 (Hammar et al.) describes a method to recrystallize a superplastically formable metal sheet and heat it to the prescribed temperature for the immediate forming operation. The method uses a combination of hot air and infrared radiation to quickly reach the desired temperature. The high temperature infrared elements provide most of the energy during the first phase of rapid heating. Later, these elements are turned off and the heating of the sheet is controlled by hot air to prevent overheating.

U.S. Pat. No. 5,410,132 (Gregg et al.) describes an apparatus and a method for superplastic forming in which the piece is positioned between two thermally and electrically non-conductive molds and is induction heated by a coil embedded inside the molds.

U.S. Pat. No. 5,467,626 (Sanders) describes self-supporting molds, made of ceramic material, for superplastic forming, which do not need a metal casing to withstand the high closing forces of the press and the forces exerted by the gas, and are equipped with an improved depressurization system, such as to avoid catastrophic breakages potentially harmful to the press or the operators. Heating of the mold can take place through cartridges, resistance wires, quartz lamps and by induction.

The hot deformation behavior of sheet materials is strongly dependent on the temperature at which they are deformed. In fact, even small variations in temperature, of the order of about ten degrees centigrade, can alter the flow tension of the material and its ductility.

It follows that even a slight deviation from the desired process temperature can cause the material to deform, differently from what was expected, with deformation speeds and ductility that can vary even significantly.

Such deviation can lead to a possible premature breaking of the sheet during the molding process, to a final distribution of thicknesses with undesired thinnings, which can lead to the formed component being rejected, and to the onset of appearance defects on the component, due to adhesion between the mold and the sheet, linked to localized overheating of the mold surface.

On the other hand, possible breakage of the sheet is not only due to a possible loss of ductility but also to a different response of the material to the pressure cycle imposed.

The pressure profile is in fact commonly calculated through the use of a numerical code based on finite element simulation, in isothermal conditions, and is aimed at maintaining, in the material, the maximum value of the deformation rate contained in a narrow range around a prescribed value.

This profile is highly dependent on the geometry of the mold which determines the pressure value to be used in the various stages of filling the cavity of the mold itself.

A variation in the rheological behavior of the material, due to a significant variation in temperature, causes a phase shift between the imposed pressure cycle and the filling of the mold with obvious consequences on the actual deformation rate experienced by the material which can depart from the optimal range.

It follows that it is of fundamental importance to keep the temperature of the molds, and therefore of the sheet, as uniform and constant as possible during the entire forming time.

The temperature distribution is commonly monitored through the use of multiple temperature sensors, which grant control of the electrical power with which the resistors, or groups thereof, are powered.

A single malfunctioning resistor can therefore compromise the success of the forming process and it is necessary to intervene as quickly as possible by repairing or replacing the compromised heating elements.

This repairing or replacement operation is often hindered by the difficulty of extracting the heating elements from the heating system that is either integrated or not in the mold, which requires complete or partial cooling of the mold, in turn possibly requiring several hours of machine downtime.

In the automotive sector, the most widely adopted solutions involve the use of cartridge heaters or candle heaters embedded directly in the mold or, alternatively, the use of an oven press that heats the entire mold.

In fact, cartridge resistors have the advantage of heating the mold areas of most interest without having to heat its entire mass.

In order to function correctly and to guarantee a useful life of the same resistors as long as possible, the holes in which they have to be inserted must have diameters very close to those of the cartridges themselves, with very tight dimensional and geometric tolerances, which make the machining of the holes themselves, especially for cartridge resistors of significant length, not only lengthy and expensive, but also difficult.

Uniformity of the temperature depends on the number of cartridge resistors and related control sensors. However, this solution constitutes a "discrete" heating system with an area-type management of the mold which, in any case, leads to a temperature distribution that is not perfectly uniform.

In the second solution, an oven press insulated towards the outside is provided, which allows the entire mold to be heated using the radiation and convection heating principles. The advantages of this solution lie in the ease of construction of the molds, which do not have particularly complicated processing on account of the allocation of the cartridges, and in the possibility of obtaining a uniform temperature in all the areas of the mold. On the other hand, having to heat the whole mold means that the times to reach steady state and therefore the target temperature are longer than with the other solutions, as more mass has to be heated.

A variant of this system are presses with heated platens as described in U.S. Pat. No. 4,888,973 (Comley), according to which each press has two heated platens and the mold.

This structure recreates an oven press by heating the plates by means of internal wires, accordingly similar to mold heating using cartridges, which can be controlled in groups.

This structure also has the problem of heating times, as the entire mass of the mold mounted in the press has to be heated.

Publication No. WO2019/084128A1 relates to a heating system for monolithic thermocasting, for the high temperature forming of large hollow architectural elements of plastic material.

Patent No. CN101468373A describes a self-heating system of a mold for sheets.

Publication No. U.S. Pat. No. 9,056,413B1 illustrates a system of resistors and ventilation to achieve a uniform temperature distribution on the mold surface.

Patent No. U.S. Pat. No. 2,689,372A describes a system for maintaining thermal equilibrium with ventilation of composite materials.

US2011/014315A1 relates to a molding system for reinforced composite materials.

SUMMARY OF THE INVENTION

The aim of the present invention is to provide a mold for the hot forming of sheet materials, suitable for overcoming the drawbacks of the prior art mentioned above, in particular in superplastic forming, Quick Plastic Forming, High Speed Blow Forming, Hot metal gas forming, or Drape Forming processes.

One object of the invention is to provide a mold which guarantees, during the heating process, uniformity of temperature.

A further object of the present invention is to provide a mold which allows the limits of the known systems for preheating the sheet alone to be overcome, so that its properties may be checked before forming in the heated mold, with all the problems described above.

Another object of the invention is to provide a mold that is easy to maintain and capable of ensuring the greatest guarantees of reliability and safety in use.

BRIEF DESCRIPTION OF THE DRAWINGS

These and other objects and advantages result from the following description of some preferred embodiments of the mold of the invention illustrated by way of non-limiting example in the figures of the attached drawing tables.

In these.

DETAILED DESCRIPTION OF THE INVENTION

Figure 1:
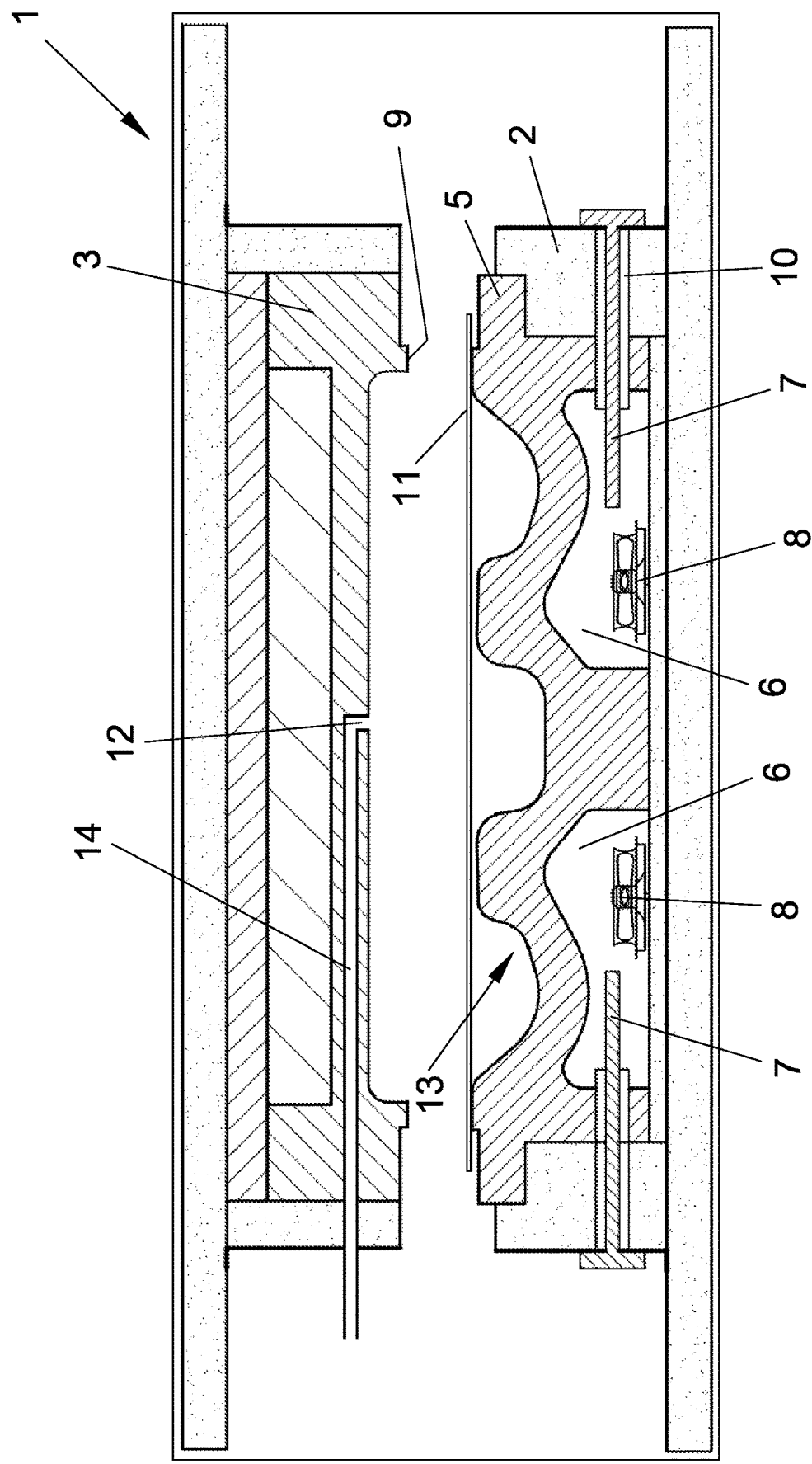
FIG. 1 is a sectional view of a first embodiment of the mold of the invention in the open position.

With particular reference to the numerical symbols of the aforementioned figures, the mold of the invention, indicated as a whole with the reference number 1, comprises a first half-shell 2 equipped with the die 5 of the mold, and a second half-shell 3, which identifies a sealing ring 9 suitable for forming a forming chamber 4 (FIG. 2), by cooperation with the first half-shell 2 of the mold in the closed position. Advantageously, the external walls of the half-shell 2 and of the half-shell 3 are thermally insulated, so as to avoid heat being dispersed.

In turn, inside the die 5, made of metal material such as steel or cast iron and bearing the templates or shapes 13 to be impressed on the sheet 11 to be molded, one or more ventilated chambers 6 are provided, arranged on its side opposite the second half-shell 3. Arranged inside these ventilated chambers 6 are heating assemblies 7, preferably electric resistors, and also fan assemblies 8 suitable for heating by convection the air present in the chambers 6.

Advantageously, the electric resistor assembly 7 of one or more ventilated chambers 6 is mounted from the outside of the half-shell 2 and passes through to the aforementioned ventilated chambers 6.

Arranged above the shapes 13 of the die 5 is the sheet 11 to be molded, which is made of metallic material such as for example aluminum, magnesium and their alloys, or of plastic material and the like. The sheet 11 is deformed under heat against the same shapes 13 due to the combined action of heating of the die 5, by means of the resistor assemblies 7 and the fan assemblies 8, and of the pressure generated on the surface of the sheet 11 opposite the die 5 by a pressurized gas, such as for example nitrogen or argon, fed into the forming chamber 4 of the mold 1 through channels 14 which run through the half-shell 3 to corresponding discharge holes 12.

According to the present invention, the fan assembly 8 and the resistor assembly 7, arranged in the underlying part of the die 5, create a convective air flow, capable of heating the surface of the shapes 13 of the same die 5 which receive the corresponding deformation of the sheet 11. In fact, the air circulating in the chambers 6 touches the surface of the die 5 below the shapes 13, thus achieving a homogeneous and controlled heating of the entire useful surface of the die which receives the sheet 11.

This heating technique allows the amount of work required to introduce the heaters into the mold to be reduced, also allowing a quick and "in process" maintenance, by removing the resistor 7 coupled to the fan assembly 8 of the heated compartment 6 and replacing it with a new one, thanks to the application by means of a corresponding pocket 10 passing laterally through the half-shell 2 and the same die 5 of the mold 1.

Homogeneity of the temperature on the useful surface of the mold is useful for solving the production problem, especially during the mold's start-up phase.

With the present invention, the possibility of heating or preheating the mold off-line is maintained, as the heating system is linked to the single mold.

According to a further aspect of the invention, additional heaters are provided, for example flat heaters, such as strip heaters, on the ends of the mold, to further improve uniformity of the temperature of the mold itself.

For this purpose, the addition is envisaged of local heating modes, by means of cartridge heaters or by combining a heating system, of the "heated platens" type, with the present invention.

According to a further aspect of the invention, the heater assembly can be made by means of infrared heaters and/or hybrid systems combined with cartridges, oven press, etc.

In the embodiment described above, the mold of the invention has two half-shells 2,3 which between them define a forming chamber 4. However, without departing from the scope of the invention, the part called die, that is the part that contains the shape of the piece to be molded, is not necessarily the lower one. In this type of processing, the influence of gravity is in fact negligible, or in any case not very significant, so that the die can also be provided in the upper half-shell.

Figure 2:
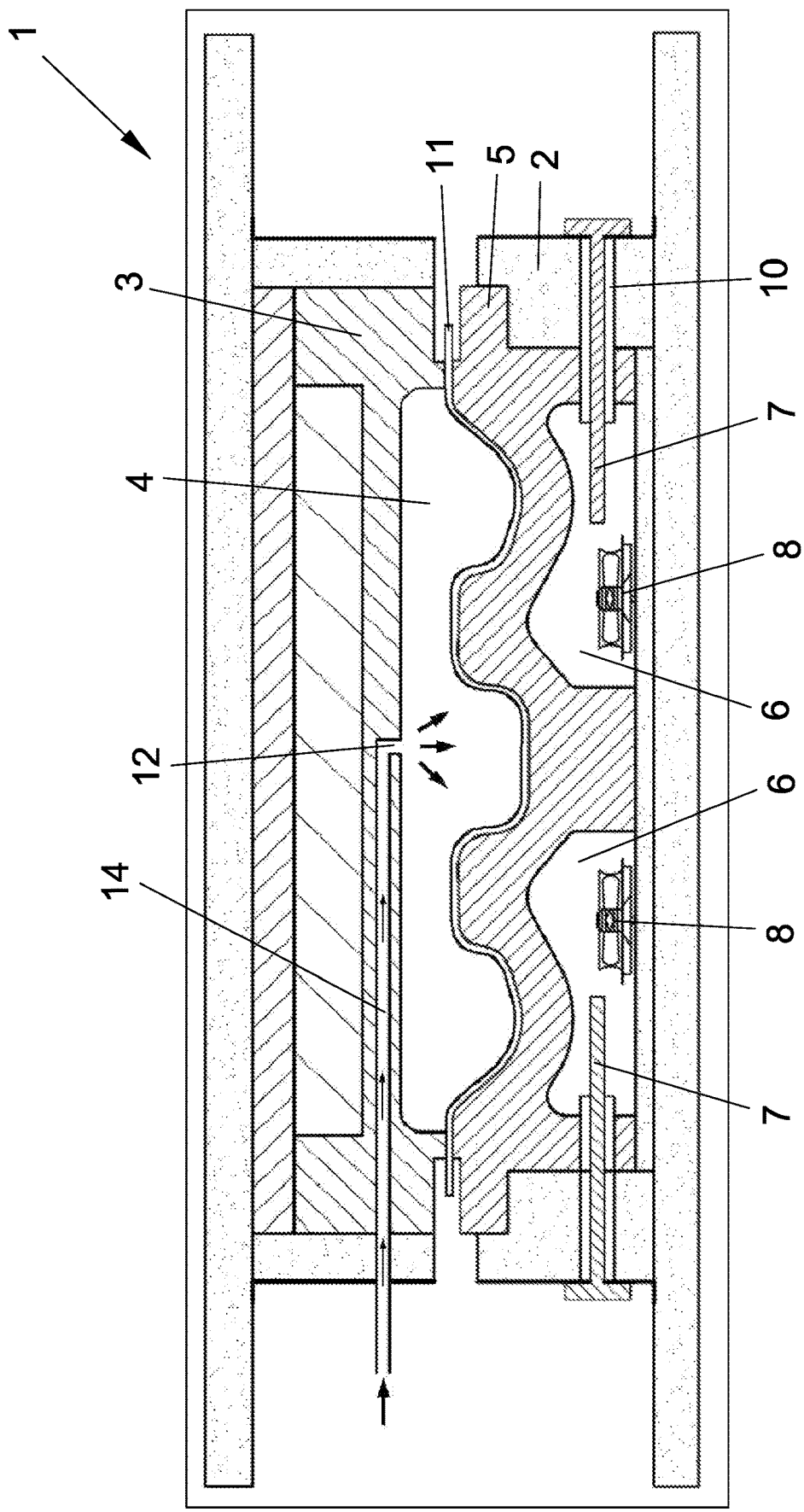
FIG. 2 illustrates the mold of FIG. 1 in the closed position.
Figure 3:
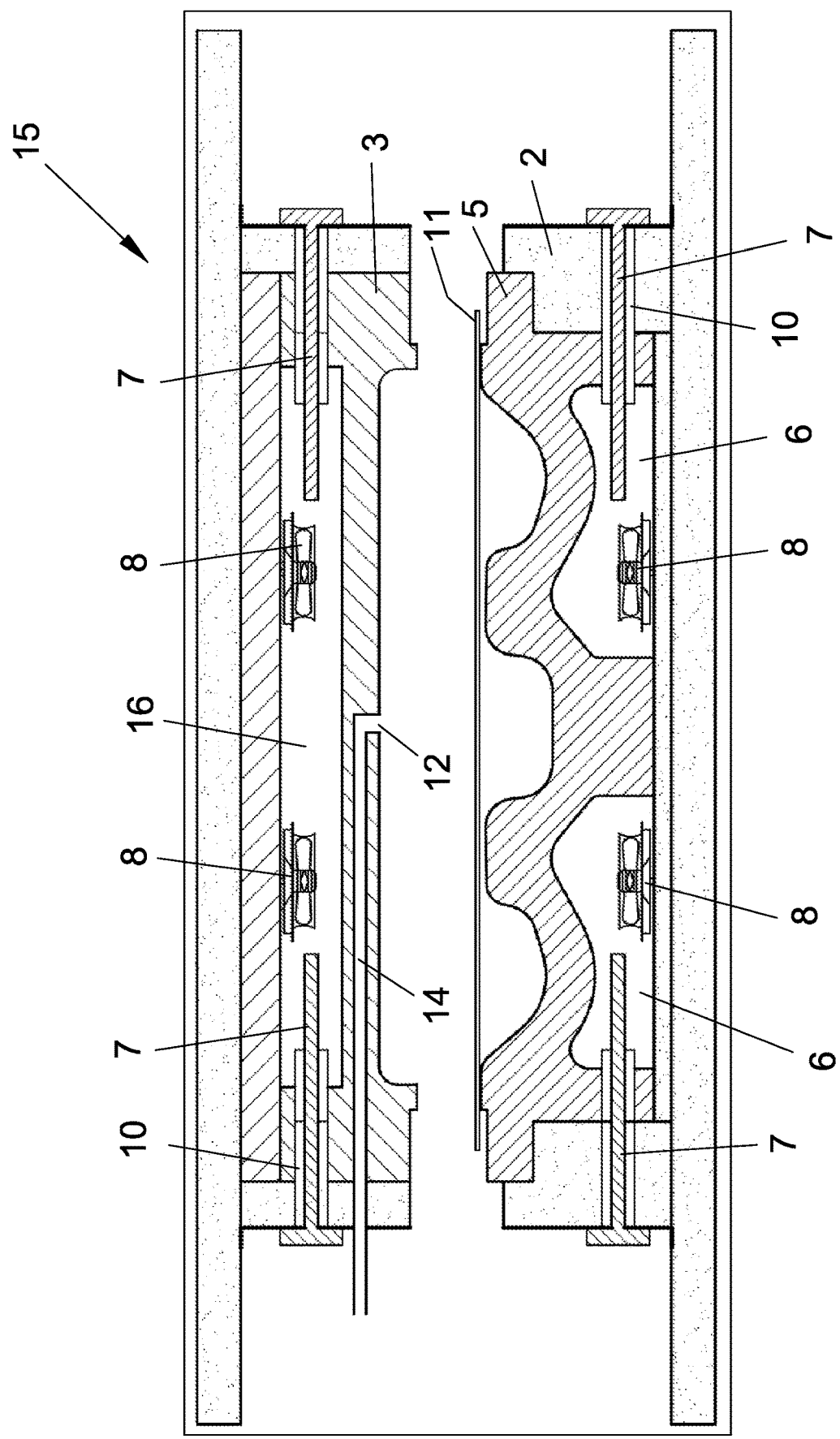
FIG. 3 is a sectional view of a variant of the mold of the invention in the open position.
Figure 4:
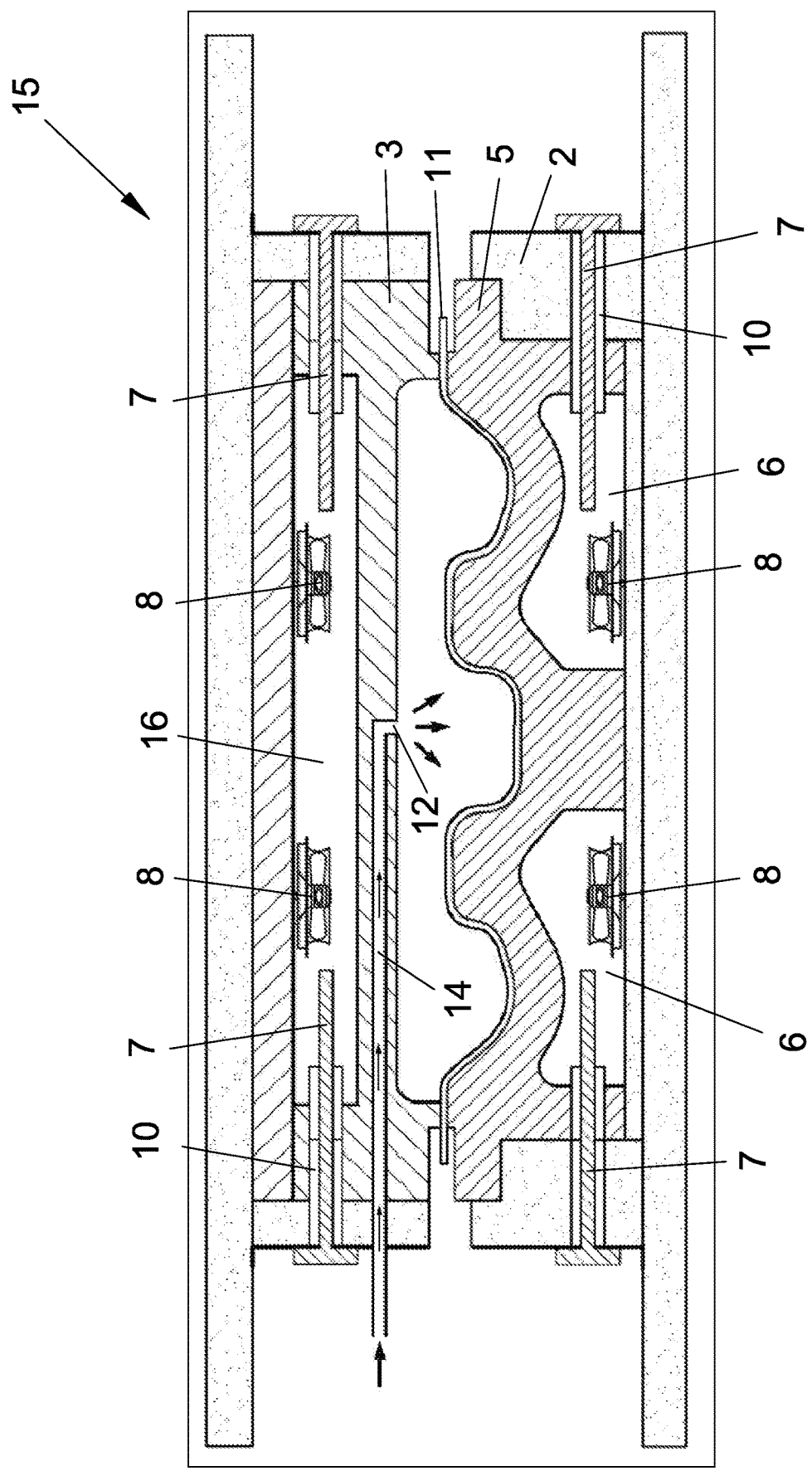
FIG. 4 illustrates the mold of FIG. 3 in the closed position.

According to the variant illustrated in FIGS. 3 and 4, the mold of the invention, indicated as a whole with the reference number 15, has its second half-shell 3 also provided with at least one chamber 16, heated and ventilated with the same principle as the embodiment shown in FIGS. 1 and 2.

This embodiment offers the advantage, not so much of uniformity of temperature, since the sheet 11 is not directly in contact, but rather of providing heat by radiation from the surface of the half-shell 3, which does not contain the die, towards the sheet 11 itself.

It has been seen in practice that this invention accomplishes the intended aim and objects.

In fact, a structure has been provided which clearly differs from the devices of the prior art, which heat the mold by convection.

Although heating by forced convection with hot air is mentioned in U.S. Pat. No. 6,835,254B2, in this document the heating mode is dedicated to the sheet and not to the mold, as in the device object of the present invention, and not aimed at ensuring uniformity of temperature all through the process.

According to what is described in U.S. Pat. No. 6,835,254B2, the type of heating is a preheating of the sheet only, in order to control its superplastic properties, and takes place before forming in the mold, which must be heated in any case, with all the problems described above.

One of the advantages of the present invention, with respect to all of the prior art mentioned above, is constituted by the improved maintainability of the molds for hot forming.

Naturally the materials used, as well as the dimensions, can be any according to the needs.

The invention claimed is:

1. A mold for a hot forming of a sheet of material, the mold comprising a first half-shell bearing a die, a second half-shell, and a chamber formed between said first half-shell and said second half-shell for forming of said sheet, the second half-shell being provided with channels and respective holes for feeding a pressurized gas into said chamber, wherein inside said die at least one ventilated chamber is provided, and said at least one ventilated chamber is equipped with heating assemblies and ventilation assemblies for circulation of hot air inside said at least one ventilated chamber.

2. The mold according to claim 1, wherein said heating assemblies include electric resistors mounted from outside of the mold and passing through to said at least one ventilated chamber.

3. The mold according to claim 2, further comprising a pocket adapted to receive said electrical resistors.

4. The mold according to claim 2, further comprising additional heaters, on ends of said mold, to further improve temperature uniformity of the mold.

5. The mold-according to claim 1, wherein said ventilation fan assemblies and said heating assemblies are arranged so that said circulation of hot air is a convective circulation.

6. The mold according to claim 1, wherein said-air circulation of hot air touches an internal surface of said die.

7. The mold according to claim 1, wherein said second half-shell is provided with at least one chamber, said at least one chamber of said second half-shell being equipped with respective heating assemblies and ventilation assemblies for said circulation of hot air inside said at least one chamber of said second half-shell.

8. The mold according to claim 1, further comprising additional infrared heating assemblies.

* * * * *